April 27, 1965   N. J. L. FELDMAN   3,181,158
WATER-BORNE DISTRESS UNIT
Original Filed March 11, 1960

INVENTOR
NEVILLE J. L. FELDMAN
BY Gene W. Arant
ATTORNEY

United States Patent Office 3,181,158
Patented Apr. 27, 1965

3,181,158
WATER-BORNE DISTRESS UNIT
Neville J. L. Feldman, Hollywood, Calif., assignor of one-fourth to Kenneth W. Grinde, Inglewood, Calif.
Continuation of abandoned application Ser. No. 14,378, Mar. 11, 1960. This application Dec. 7, 1961, Ser. No. 157,726
1 Claim. (Cl. 343—18)

This application is a continuation of my co-pending application, Serial No. 14,378, filed March 11, 1960; now abandoned.

The present invention relates to a water-borne distress unit including radar reflector means as well as radio transmitting means.

In the event of distress at sea several methods of communication are possible. The distressed party may be able to transmit radio signals or visual signals, or perhaps both. Also, irrespective of whether or not he is able to positively transmit radio or visual signals, he may be provided with equipment or apparatus which will passively present a readily identified appearance to visual observation or to radar observation or both.

The present invention is primarily concerned with the radio transmission of distress signals and with providing a radar reflector or target which is easily observed and identified by radar equipped searching crews. More specifically, the present invention is concerned with apparatus which simultaneously performs the dual functions of radio transmission and radar reflection.

The frequencies used at sea for radio transmission and for radar detection are widely separated. For example, the frequency on which radio distress signals are transmitted may have a wave length of approximately 400 meters while the search radar may operate on a transmitted frequency having a wave length of only 10 centimeters. The radio antenna needs to have substantial length, preferably about one-fourth of a wave length, and supporting an antenna having this much length is a fairly difficult matter. A radar reflector needs to have a flat surface, or equivalent, whose minimum width is at least one wave length, and which faces in the direction from which the radar beam is being transmitted. Unfortunately, it is not possible to anticipate the direction from which a radar equipped surface vessel or aircraft may approach, hence the radar reflector needs to be omni-directional. Furthermore, when a radar reflector is close to the surface of a body of water the radio waves which it reflects become intermingled with those reflected from the body of water, and the radar operator is unable to distinguish the two.

It is also interesting to note that the radio waves when transmitted from a vertical antenna are not only transmitted horizontally outward in all directions but will also follow a curved path which conforms to the surface of the water with the result that they can be picked up at points which are over the horizon. On the other hand, the operation of a search radar set involves the straight-line transmission of a radio wave, the reflection of that radio wave from a target or object which is capable of reflecting same back in the direction from whence it came, and the straight-line transmission of the reflected wave back to the sending source. Therefore, a distress situation can be detected by radar from a point over the horizon only if a radar reflector is displayed in a sufficiently elevated position to be visible on a direct line of sight from the location of the search radar set.

One object of the invention, therefore, is to provide water-borne distress apparatus which simultaneously performs the functions of radio transmission and radar reflection.

Another object of the invention is to provide apparatus of the above type which is of light weight, compact, and inexpensive.

The objects and advantages of the invention will be more readily understood from the following description considered in conjunction with the accompanying drawing, in which.

Figure 1:
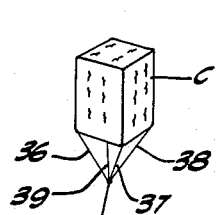
FIGURE 1 is a perspective view of a preferred form of the invention in operation.
Figure 4:
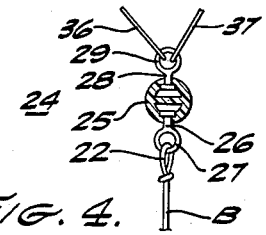
FIGURE 4 is an enlarged fragmentary view illustrating the coupling of the upper end of the antenna cable to the balloon.
Figure 5:
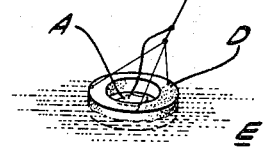
FIGURE 5 is an enlarged fragmentary view illustrating the coupling of the lower end of the antenna cable to the floatable housing.
Figure 2:
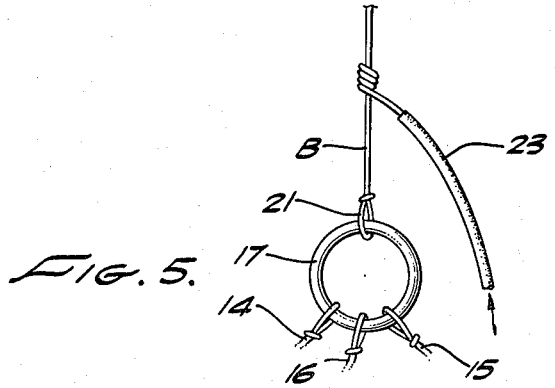
FIGURE 2 is a perspective, partially cut-away view of the balloon of FIGURE 1.

Referring now to the drawing, the presently preferred form of the invention is seen to include a transmitter A, an antenna cable B, and a balloon C. Transmitter A is carried within a floatable waterproof housing D which floats upon the surface of a body of water E. Antenna cable B has its lower end mechanically coupled to housing D and electrically connected to transmitter A, while the upper end of cable B is coupled to balloon C.

Balloon C is made of resilient sheet material having a metallic substance intimately associated with substantial portions thereof. During operation of the distress unit the balloon is inflated with lighter-than-air gas so as to support cable B in a substantially vertical configuration. By virtue of its metallized surface portions balloon C not only supports cable B to provide an antenna for transmitter A, but at the same time serves as a radar reflector or target which is elevated the proper distance above the surface of the body of water E.

Housing D includes a waterproof box 10 within which transmitter A is carried. Box 10 may, for example, be integrally formed of plastic material by casting or other suitable process. A plate 18 is made of an electrically conductive metal and is supported within the bottom wall of box 10 in such a position that part of the surface of the metal plate is in contact with the body of water. Plate 18 therefore acts as an electrical ground for transmitter A, all of whose circuits are grounded to the upper surface of the plate in a conventional and well known manner. About the upper periphery of box 10 there are positioned fasteners such as 11, 12, to which the respective lower ends of ropes such as 14, 15, 16 are coupled. The upper ends of ropes 14, 15 16 are connected to a rigid coupling ring 17.

Antenna cable B has its lower end 21 tied to the coupling ring 17 while its upper end 22 is tied to a swivel joint 24 which is in turn supported from the balloon C. A short length of metallic cable 23 has its upper end mechanically and electrically connected to the metallic antenna cable B near the lower end thereof, while the lower end of cable 23 is connected in a similar manner to the transmitter A. The output voltage of transmitter A is applied between jumper cable 23 and the ground plate 18, hence antenna cable B receives an oscillating voltage relative to the potential of the body of water E. Transmitter A is battery powered.

Figures 3, 6:
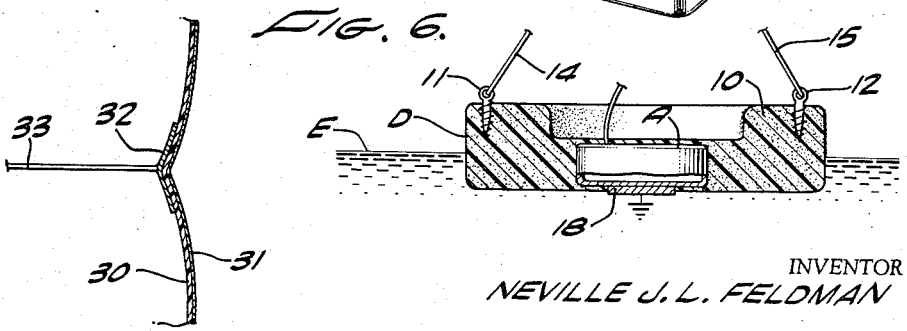
FIGURE 3 is a cross-sectional view of the interior structure of the balloon taken on the line 3—3 of FIGURE 2.
FIGURE 6 is a cross-sectional elevational view of the floatable housing of FIGURE 1.

Balloon C when inflated has a substantially cubical configuration with its vertical dimension being somewhat greater than its width or depth in the horizontal plane. The walls of balloon C are made of a resilient sheet material 30 which is preferably plastic but may be a weatherproof fabric material. As shown in FIGURE 3 the exterior surface of the walls 30 is covered with a metal coating 31, and this result is easily achieved simply by applying aluminum paint to the outer surface of the balloon when in a fully inflated condition. A satisfactory result may also be achieved by utilizing plastic material into which a metallic component has been injected, so that the sheets 30 when formed have a sufficiently metallic composition to efficiently reflect a radio wave.

Balloon C as illustrated includes a number of internal tie strings for maintaining its substantially cubical shape when inflated. The horizontal strings extending in one direction are designated 33 while those in the other direction are designated 34 and the vertical strings as 35. A reinforcement portion 32 of sheet material is attached to the inner surface of wall 30 at each point where a tie string is connected thereto. Downwardly depending ropes 36, 37, 38, 39 are connected to the four lower corners of balloon C.

Swivel joint 24 includes a body member 25 which rotatably receives a lower pin 26 and an upper pin 28. A ring 27 is connected to the lower pin 26, and upper end 22 of cable B is tied to the ring 27. A ring 29 connected to the upper pin 28 has the lower ends of ropes 36, 37, 38, 39 tied thereto. Pins 26 and 28 are vertically aligned on a common axis and are freely rotatable relative to each other. Therefore, balloon C is permitted to rotate about its vertical axis without causing any twisting in the antenna cable B. Stated another way, regardless of the position of the balloon C the antenna cable B is permitted to retain itself free of any twisting stress.

Each of the four vertical walls of balloon C presents an efficient radar reflector surface, each two adjacent walls being separated by an angle of 90 degrees. Since housing D bobs up and down on the surface of the ocean or other body of water, and since balloon C encounters wind currents which are irregular, the balloon C tends to rotate about its vertical axis to a certain extent. Radar detection of the balloon C from any angle of approach is therefore relatively easy.

The dual function of the balloon is of utmost significance. It acts as a radar reflector, and concurrently supports the radio antenna cable B. The length of the antenna cable is preferably about 100 feet, for transmission on a standard distress frequency of 2182 kc. Balloon C may therefore be picked up by radar from a distance of many miles. Hence, not only is the radar reflector displayed in its most desirable location, but also serves to maintain the most desirable position of the radio antenna.

While it is preferred to provide the radar reflector by metallizing surface portions of balloon C, other means may also be used.

Transmitter A is preferably arranged so as to continuously transmit a pre-recorded distress message. A magnetic tape, or other type of recording medium, together with associated transducer or readout means, may be continuously actuated in order to modulate the transmitter, all in accordance with conventional techniques.

The invention is illustrated herein in conjunction with a distress unit which is independently floatable upon the surface of the ocean or other body of water. It will be readily appreciated, however, that the use of a floatable housing such as D is not essential to the invention, but rather that balloon C carrying cable B may simply be launched directly from a vessel which is in distress. Antenna cable B is then energized from a transmitter A carried on the vessel, in the same manner as explained herein.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

In a water-borne distress unit including a radio transmitter, the combination comprising: a flexible metallic cable having one end electrically connected to said transmitter and adapted to serve as an antenna therefor; an inflatable balloon having a plurality of metallized outer walls each of which is substantially flat and occupies a substantially vertical position during the normal operation of the distress unit; and a swivel joint coupling the lower end of said balloon to the upper end of said cable whereby during the operation of the distress unit said balloon is freely rotatable about its vertical axis relative to the upper end of said cable.

References Cited by the Examiner
UNITED STATES PATENTS

| | | | |
|---|---|---|---|
| 1,014,719 | 1/12 | Pennock | 343—706 X |
| 2,470,783 | 5/49 | Mead | 343—101 X |
| 2,619,303 | 11/52 | Martin | 244—33 |
| 2,752,594 | 6/56 | Link et al. | 343—18 |
| 2,795,425 | 6/57 | Orms | 244—31.5 |

CHESTER L. JUSTUS, *Primary Examiner.*

KATHLEEN H. CLAFFY, *Examiner.*